(12) United States Patent
Minto et al.

(10) Patent No.: US 9,732,609 B2
(45) Date of Patent: Aug. 15, 2017

(54) DISTRIBUTED CLAMPS FOR A DOWNHOLE SEISMIC SOURCE

(75) Inventors: James Minto, Houston, TX (US); Bruce P. Marion, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 514 days.

(21) Appl. No.: 14/125,931

(22) PCT Filed: Jun. 15, 2012

(86) PCT No.: PCT/US2012/042554
§ 371 (c)(1),
(2), (4) Date: Feb. 12, 2014

(87) PCT Pub. No.: WO2012/174310
PCT Pub. Date: Dec. 20, 2012

(65) Prior Publication Data
US 2014/0151036 A1    Jun. 5, 2014

Related U.S. Application Data

(60) Provisional application No. 61/497,404, filed on Jun. 15, 2011.

(51) Int. Cl.
*E21B 47/14* (2006.01)
*G01V 1/40* (2006.01)
*G01V 1/44* (2006.01)

(52) U.S. Cl.
CPC ............... *E21B 47/14* (2013.01); *G01V 1/40* (2013.01); *G01V 1/44* (2013.01); *G01V 2210/1429* (2013.01)

(58) Field of Classification Search
CPC ........... E21B 47/01; E21B 47/14; E21B 23/01
See application file for complete search history.

(56) References Cited

U.S. PATENT DOCUMENTS 4,715,470 A * 12/1987 Paulsson ................ E21B 23/01
181/106
4,953,136 A * 8/1990 Kamata .................... G01V 1/16
181/102

(Continued)

FOREIGN PATENT DOCUMENTS

WO       2004076813 A2    9/2004

OTHER PUBLICATIONS

Wikipedia, "Pressure", Apr. 4, 2016, Wikipedia, The Free Encyclopedia, 10 pages.*

(Continued)

*Primary Examiner* — Jennifer H Gay
(74) *Attorney, Agent, or Firm* — Michael Dae

(57) ABSTRACT

The present disclosure relates to increasing the output power of a clamped seismic or acoustic source disposed in a wellbore without damaging the borehole/casing/cement. One or more sources are provided and carried on a conveyance mechanism. The conveyance mechanism may be a wireline, a coiled tubing, or a drill pipe. The one or more sources are run into and/or out of the wellbore and temporarily disposed at various locations within the wellbore. The one or more sources are temporarily clamped to the wellbore at the various locations using distributed clamping, and a source signal is generated by the distributed clamped source. The distributed clamping device may have multiple clamping mechanisms along an increased length of the source or a continuous clamping mechanism along an increased length of the source.

9 Claims, 5 Drawing Sheets

(56) References Cited

U.S. PATENT DOCUMENTS

| | | | |
|---|---|---|---|
| 6,868,035 B2* | 3/2005 | West | G01V 1/52 181/102 |
| 7,124,818 B2* | 10/2006 | Berg | E21B 17/1021 166/250.01 |
| 7,187,620 B2 | 3/2007 | Nutt et al. | |
| 7,441,628 B2* | 10/2008 | Minto | G01V 1/52 181/111 |
| 7,721,809 B2 | 5/2010 | Minto | |
| 7,916,578 B2* | 3/2011 | Minto | G01V 1/143 181/104 |
| 9,217,320 B2* | 12/2015 | Odashima | B05B 5/081 |
| 2003/0179651 A1* | 9/2003 | Nutt | G01V 1/40 367/25 |
| 2004/0035634 A1* | 2/2004 | Rueter | G01V 1/189 181/122 |
| 2004/0196046 A1 | 10/2004 | Aidan et al. | |
| 2006/0081413 A1* | 4/2006 | Minto | G01V 1/52 181/111 |
| 2006/0225881 A1 | 10/2006 | O'Shaughnessy et al. | |
| 2007/0211572 A1* | 9/2007 | Reiderman | B06B 1/04 367/35 |
| 2009/0283355 A1* | 11/2009 | Minto | G01V 1/143 181/106 |
| 2009/0308617 A1* | 12/2009 | Minto | G01V 1/52 166/381 |
| 2014/0151036 A1* | 6/2014 | Minto | G01V 1/40 166/250.16 |
| 2014/0328139 A1* | 11/2014 | Minto | G01V 1/02 367/25 |

OTHER PUBLICATIONS

International Search Report for PCT Application Serial No. PCT/US2012/042554 dated Feb. 28, 2013.

Winbow, G.A., Borehole Stresses Created by Downhole Seismic Sources, Geophysics, vol. 56, No. 7, Jul. 1991, pp. 1055-1057.

* cited by examiner

DISTRIBUTED CLAMPS FOR A DOWNHOLE SEISMIC SOURCE

TECHNICAL FIELD

The present application relates generally to the field of well logging, and particularly to seismic well logging.

BACKGROUND

Geophysical prospecting has been used extensively in the search for underground resources such as oil, gas, and minerals. Common techniques used for exploration include seismic, gravity, magnetic, and electrical methods. Seismic is historically the most widely used and can be subcategorized into seismic reflection and seismic refraction methods. With the seismic reflection method, the structure of subsurface formations is mapped by measuring the times required for a seismic wave, generated in the earth by a near-surface explosion, mechanical impact, vibration, or air gun, for example, to return to the surface after reflection from interfaces between formations having different physical properties. The reflections are recorded by detecting instruments responsive to ground motion or pressure waves. With reflection methods, one can locate and map, for example, such features as anticlines, faults, salt domes, and reefs.

The recorded data generally are processed using computers prior to being interpreted. The basic objective of seismic processing is to convert the information recorded in the field into a form that best facilitates geological interpretation. The field data are transformed into corrected record sections. One object of the processing is to eliminate or reduce noise. Another is to present the reflections with the greatest possible resolution.

Seismic sources may be placed in a wellbore is to provide seismic data that originates closer to the target formations of interest to enhance imaging and measurement accuracy and resolution. Borehole seismic/acoustic sources have utility in many applications including seismic imaging of the subsurface, time-lapse monitoring of reservoir production and production processes, reservoir stimulation, borehole cleaning, etc. In general, the more powerful the source signal, the greater the imaging distance and monitoring area, and the more effective the stimulation or cleaning effect. The limitation in source power output is ultimately the ability of the seismic or acoustic energy to damage the wellbore and/or the casing and cement lining the wellbore. A clamped borehole source, when compared with fluid-coupled sources, is uniquely useful in producing both compressional and shear wave data, reducing the tubewave production of the source, and increasing the output of the source, especially at low frequencies.

During the decade from the early 1980s to the early 1990s, many borehole source concepts were developed by researchers for oil and gas companies and oil and gas service companies. The potential for damage to the borehole is discussed, for example, in the article "Borehole Stresses Created by Downhole Seismic Sources", Geophysics, 1991 by Winbow. Winbow teaches that many impulsive sources have a high likelihood of damaging cement behind casing in cased wells. One solution cited by Winbow is the use of fluid-coupled source such as piezoelectric sources. High-power clamped sources are specifically mentioned by Winbow as constrained in their output by considerations of cement damage.

SUMMARY

The present disclosure relates to increasing the output power of a clamped seismic or acoustic source disposed in a wellbore without damaging the borehole/casing/cement. One or more sources are provided and carried on a conveyance mechanism. The conveyance mechanism may be a wireline, a coiled tubing, or a drill pipe. The one or more sources are run into and/or out of the wellbore and temporarily disposed at various locations within the wellbore. The one or more sources are temporarily clamped to the wellbore at the various locations using distributed clamping, and a source signal is generated by the distributed clamped source. The distributed clamping device may have multiple clamping mechanisms along an increased length of the source or a continuous clamping mechanism along an increased length of the source.

Figure 1:
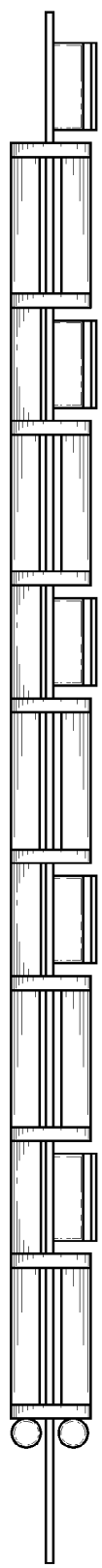
FIG. 1 shows a side view of an axis of one embodiment of the present disclosure.

It is to be understood that the drawings are to be used for the purpose of illustration only, and not to limit the scope of the appended claims.

DETAILED DESCRIPTION

Specific embodiments will now be described with reference to the figures. Like elements in the various figures will be referenced with like numbers for consistency. In the following description, numerous details are set forth to provide an understanding of the present disclosure. However, it will be understood by those skilled in the art that the present invention may be practiced without many of these details and that numerous variations or modifications from the described embodiments are possible.

The present disclosure applies, for example, to cross-borehole (or crosswell) logging, borehole-to-surface logging, or in-hole logging by seismic means for boreholes that are open, cased and cemented, or partially cased and cemented and partially open. A seismic source is run into or out of a wellbore, and measurements are made with the source at particular locations within the wellbore. Seismic receivers may be located at or near the earth's surface, in the same wellbore as the seismic source, and in another wellbore.

In one embodiment, a method is disclosed to increase the output power of a clamped seismic or acoustic source without damaging the borehole/casing/cement. Distributed clamping of the source distributes the force generated by the source over a suitably large area of the borehole, thereby keeping the stresses below those that will damage the borehole/casing/cement. Distribution of the force can be achieved in several ways, including, for example, increasing the area of the clamp that is in contact with the borehole, increasing the length of the tool, providing multiple clamping mechanisms along an increased length, or providing a continuous clamping mechanism along an increased length. Clamping can be done, for example, mechanically, magnetically, or by using inflatable elements.

One implementation of a source that incorporates a distributed clamp is the Schlumberger Technology Corporation's Z-TRAC™ source system. The source in a typical configuration of that system has two orthogonal axes, each of which employs two output modules, each of those having four four-inch long magnetic clamps. The result is a source with sixteen distributed clamps. Analysis shows stresses produced on the wellbore from those distributed clamps are below the breaking point of the cement for most borehole conditions.

The active length of a borehole seismic source is limited by the wavelength of the signal to be produced. In typical seismic applications, a broadband source is desired, and the effective wavelengths can span several octaves. A fixed length source is limited in its total clamping area by the shortest wavelength (highest frequency) for which the source will operate. By using a variable source length for each operating frequency, the active length can be shortened to match the wavelength corresponding to that operating frequency. This maximizes the output power of the source at each frequency while remaining below the output power level that will damage the borehole/casing/cement.

Producing a source with the maximum active length for a given wavelength can be implemented with a modular source design. Each module can be selected for driving (i.e., producing a source signal) based upon a desired operating frequency and the desired active length for that frequency.

A source in accordance with the present disclosure consists of two orthogonal vibrators or "Axis" with variable spacing between them. Normally the "X Axis" is above the "Y Axis" and would ideally be located at the same depth however, for obvious space reasons, the Y axis is suspended some multiple of the level spacing below the X axis. Other than the orientation, both axes are essentially identical.

The source is stationary when operated at the required depth in a well. Both axes are clamped to the casing using electromagnetic clamps and the axis are then operated alternately starting with the X axis and followed by the Y axis. Each axis is swept from a start frequency to an end frequency for a specified sweep length—in much the same way a surface vibrator or the piezo source is swept. A typical sweep for Z-Trak is 50 to 600 Hz for 5.6 seconds and may be repeated any number of times up to 99.

Referring now to FIG. 1, the central component of each axis is a flat steel bar around 3 inches wide and 7/16" thick referred to as the armature. This armature extends a few inches beyond the end of each axis to allow attachment to the cable head or the other axis. Evenly distributed along this armature are 6 clamp magnets. Each clamp magnet is firmly attached to the armature and has replaceable "feet" to conform to different diameter casing.

Between each clamp magnet is a driver assembly. Each driver assembly consists of two halves, surrounding the armature and spaced from the armature by an "air gap" of 0.030" on each side. The air gap is maintained by coiled springs between the drivers and the armature located in end caps attached to each end of each driver assembly.

To increase overall driven mass of the source, a supplemental mass is attached between each driver assembly, behind, but separate from each clamp magnet.

When vertical, all supplemental masses and driver assemblies are supported by roller bearings attached to the bottom end of the armature. Support bars (not shown in FIG. 1) run the length of the tool to join the driver mass, end caps and supplemental masses together.

Therefore, each source axis consists of two integrated but mechanically separate assemblies; the first assembly has the armature and clamp magnets and the second assembly has the driver assemblies, end caps and supplemental masses. This second assembly is referred to as the reaction mass and is supported at the bottom end by the roller bearings and along its length by the coiled springs. The armature assembly is rigidly attached to the well casing by the clamp magnets and the reaction mass is moved around relative to the armature by activating electromagnets in each driver assembly.

Figure 2A:
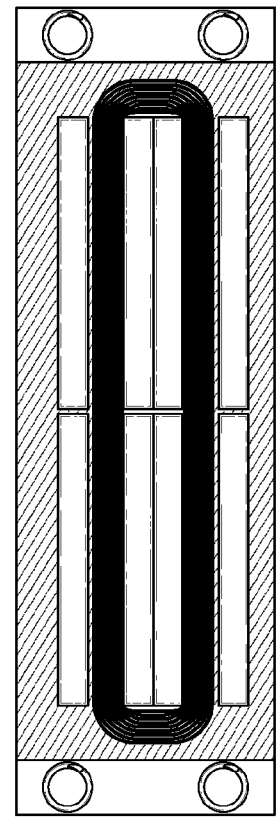
FIG. 2 shows a view of a driver assembly of one embodiment of the present disclosure.
Figure 2B:
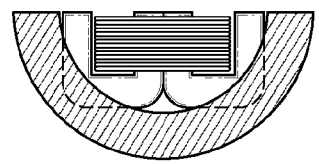

Referring now to FIG. 2, the driver assembly consists of two halves. Each half has an electromagnet consisting of a copper wire coil and silicon iron laminated cores attached to a lead mass. End caps attached to the lead mass contain coil springs and spring tension adjusters to set and maintain the necessary air-gap between the electromagnet poles and the armature.

The two halves of a driver assembly are bolted together around the armature with spacers to set the total airgap to approximately 0.060". After the source is completely assembled then the spring compression is adjusted to equalize the air gap on each side of the armature.

Figure 3:
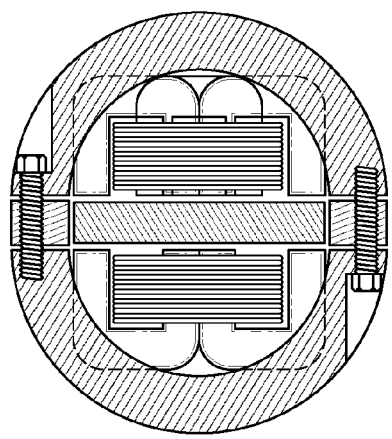
FIG. 3 shows a driver electromagnet assembly of one embodiment of the present disclosure.
Figure 4:
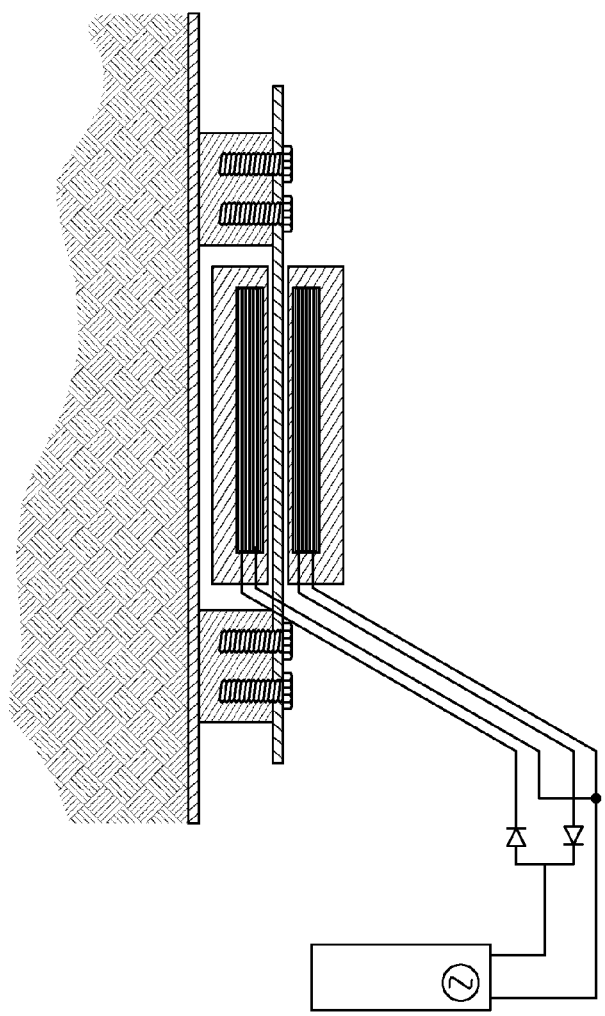
FIG. 4 shows a driver armature assembly of one embodiment of the present disclosure.
Figure 5:
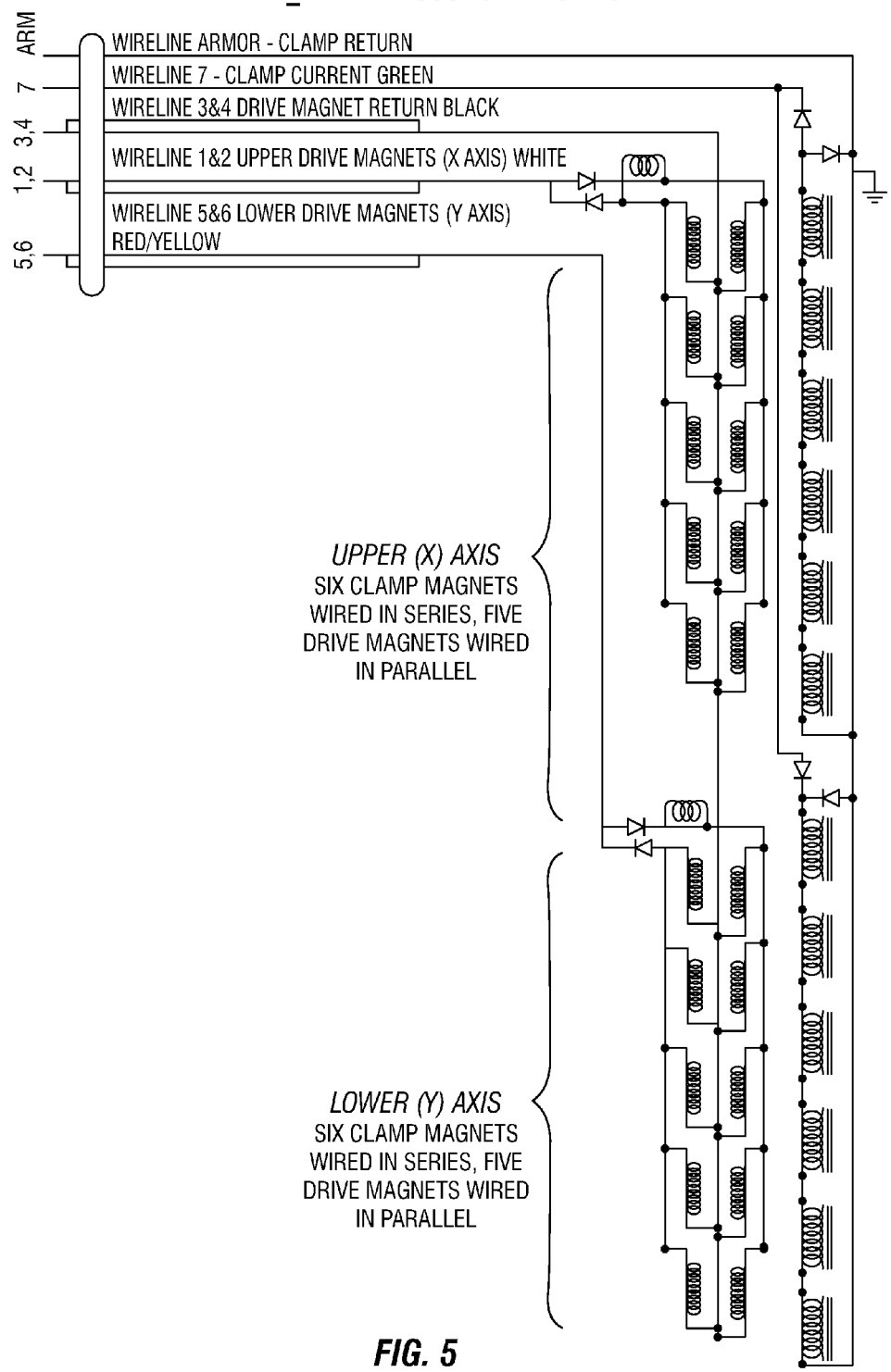
FIG. 5 shows a system diagram of one embodiment of the present disclosure.
Figure 6A:
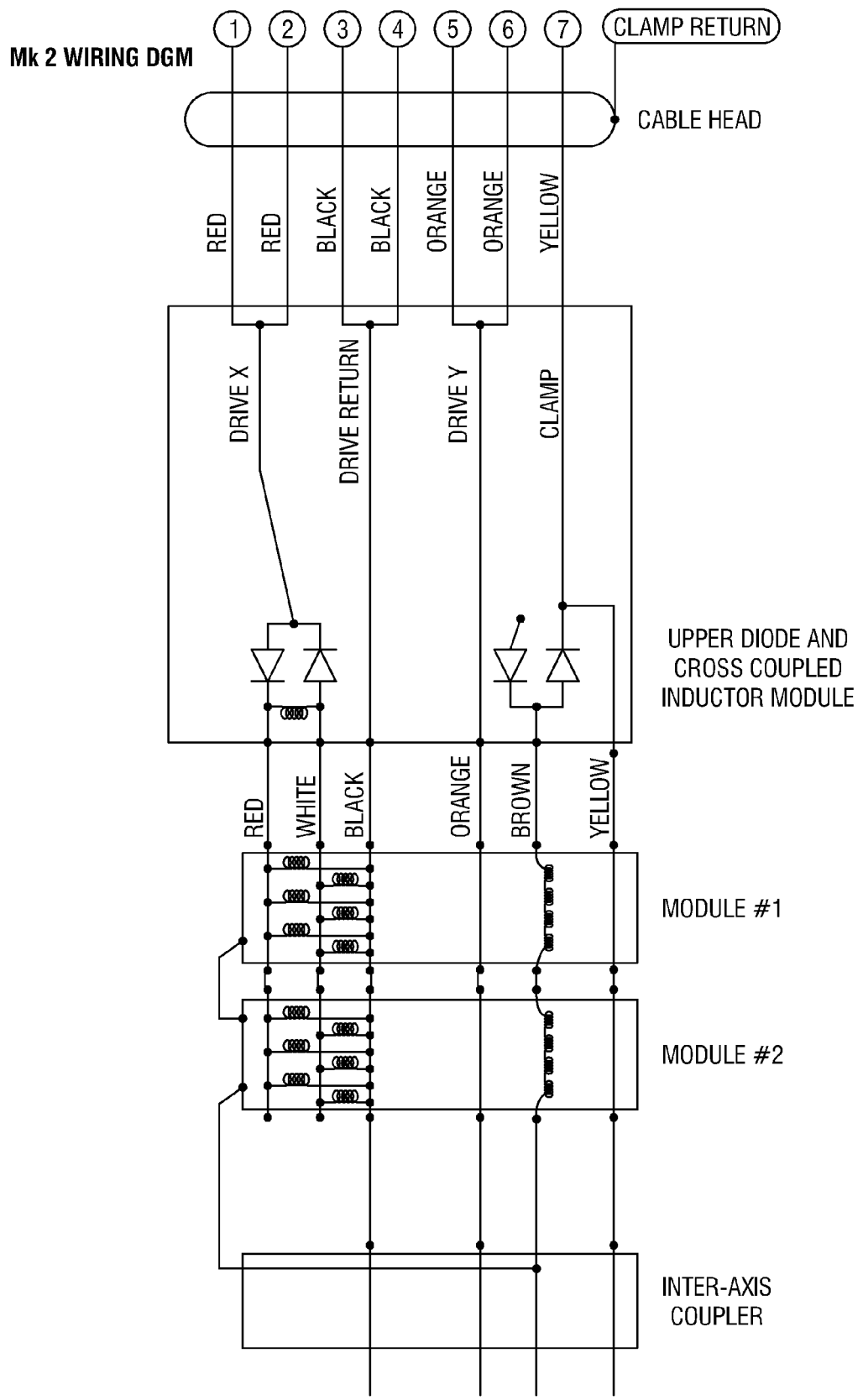
FIGS. 6A and 6B show an illustrative circuit diagram of one embodiment of the present disclosure.
Figure 6B:
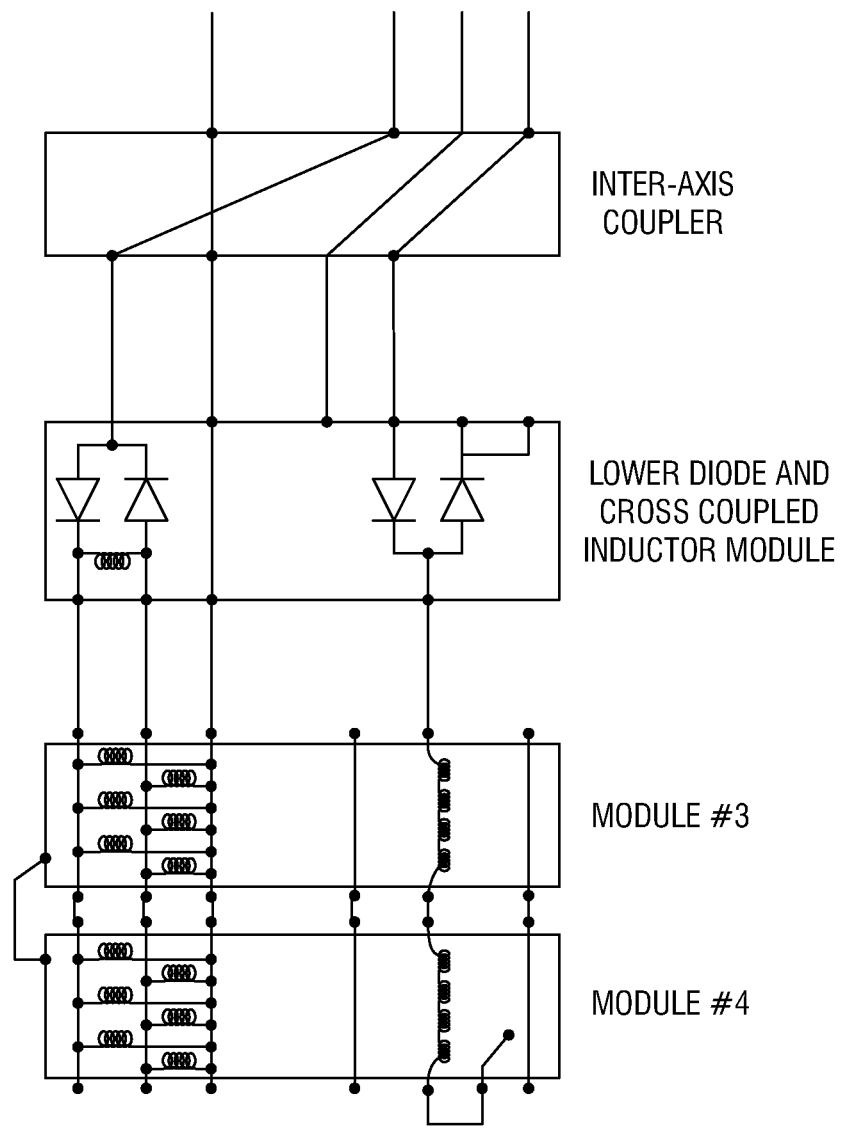

Referring now to FIG. 3 for a discussion of the theory of operation, with the clamp electromagnets activated, the armature is held firmly in contact with the casing. When the drive voltage is positive, the current is steered through the drive coil on the casing side of the armature causing that electromagnet to attract the armature. The entire reaction mass assembly comprising both halves of the driver assembly is therefore pulled to the Right as shown in FIG. 3.

If the drive voltage then swings negative, the current is steered to the electromagnet on the other side of the armature and the reaction mass moves in the opposite direction, to the left.

While the invention has been described with respect to a limited number of embodiments, those skilled in the art, having benefit of this disclosure, will appreciate that other embodiments can be envisioned that do not depart from the scope of the invention as disclosed herein. Accordingly, the scope of the invention shall be limited only by the attached claims.

What is claimed is:

1. A method of using a clamped seismic or acoustic source disposed in a wellbore without damaging the borehole/casing/cement, comprising:
   providing a modular source with a plurality of source modules for producing a source signal;
   coupling the modular source to a conveyance mechanism;
   running the modular source along the wellbore via the conveyance mechanism;
   applying distributed clamping to clamp the modular source to the wellbore; and
   generating the source signal using the modular source while clamped to the wellbore, the generating comprising driving a selected set of source modules of the plurality of source modules to provide a maximum active length of the modular source based on a desired operating frequency of the source signal.

2. The method of claim 1, wherein the conveyance mechanism includes a wireline, a coiled tubing, or a drill pipe.

3. The method of claim 1, wherein the wellbore is open, cased and cemented, or partially cased and cemented and partially open.

4. The method of claim 1, wherein applying distributed clamping comprises providing multiple clamping mechanisms along a length of the modular source.

5. The method of claim 1, wherein clamping comprises clamping the modular source to a casing.

6. The method of claim 1, wherein clamping comprises magnetically clamping.

7. The method of claim 1, wherein the modular source is directed along two or more orthogonal axes.

8. The method of claim 1, wherein generating comprises limiting an active length of the source based on the wavelength of the source signal to be produced.

9. The method of claim 1, further comprising using source modules deployed along an X axis and a Y axis located below the X axis.

* * * * *